(No Model.)

J. STAFFORD.
COVER FOR ELECTRIC SUBWAYS.

No. 429,251. Patented June 3, 1890.

Attest:
A. N. Jesbera
E. M. Watson

Inventor:
John Stafford
By David A. Burr
Atty.

UNITED STATES PATENT OFFICE.

JOHN STAFFORD, OF NEW YORK, N. Y.

COVER FOR ELECTRIC SUBWAYS.

SPECIFICATION forming part of Letters Patent No. 429,251, dated June 3, 1890.

Application filed March 19, 1890. Serial No. 344,555. (No model.)

*To all whom it may concern:*

Be it known that I, JOHN STAFFORD, of the city, county, and State of New York, have invented a new and useful Improvement in Covers for Testing-Vaults and the Man-Holes for Electrical Subways; and I do hereby declare that the following is a full and exact description thereof, reference being had to the accompanying drawings, and to the letters of reference marked thereon, making a part of this specification.

My invention relates to an improvement in coverings for the subterranean testing-vaults or the man-holes in subways for electrical conductors.

It has for its object to prevent an inflow of surface-water into the vault or subway, and to provide a strong serviceable cover for the openings into the same.

It consists in the combination, as is hereinafter described and claimed, with the inclosing-wall of a man-hole or testing-chamber, of an outer concentric wall or casing placed so as to leave an open interval between the two and carried up higher than the inner wall, and of a cover made to fit closely upon the top of the inner wall with a tight joint and to project beyond the same into contact with the inner periphery of the outer wall, so as to be encircled and protected thereby.

Figure 1:
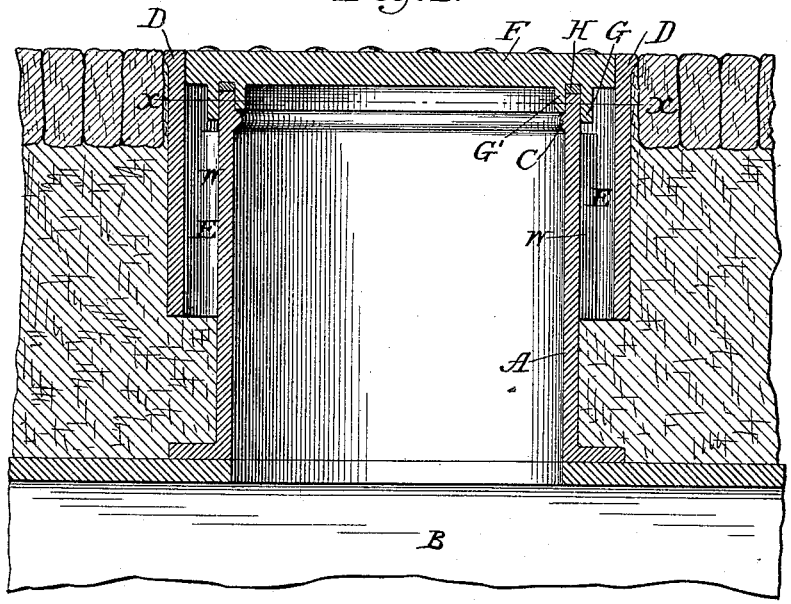
Figure 2:
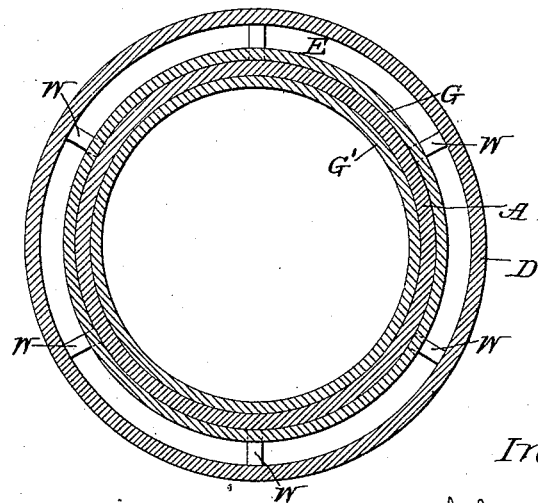

In the accompanying drawings, Figure 1 is a central vertical section of a man-hole cover or casing constructed in accordance with my invention; Fig. 2, a horizontal section thereof in line *x x* of Fig. 1.

A represents the wall serving to inclose the man-hole by which access is had to a subway B, adapted for the reception of electrical wires or other similar purposes; or it may represent the wall of a testing-vault or other chamber buried below the surface of the ground for use in connection with subterranean electrical cables or conduits. This wall A is customarily made of cast-iron and cylindrical in form, as shown in the drawings; but it may be constructed in a square form or be made otherwise angular in cross-section, and by preference it has a slight circumferential ledge C, formed about its inner periphery near its upper end, to afford a support for the lower edge of the inner flange of the cover.

D is a second outer wall or jacket, formed concentrically about the first at a little distance therefrom, so as to leave an open interval or drip-chamber E between them. The outer wall D is made to extend up to a height above the inner wall A about equal to the thickness of the cover to be fitted upon the latter; but its length is made less than that of the inner wall, so as to allow a clear space under it above the bottom of the latter or its connection with the subway B.

The walls D and A may be connected by radial plates W W, (see Fig. 2,) so as to preserve the interval between them, and may be both formed in one casting.

The cover F consists of a heavy cast-iron plate having upon its under or inner face two concentric or parallel flanges G G', projecting therefrom in position to receive and embrace closely between them the upper edge or rim of the inner wall A. The outer flange G is preferably made longer than the inner flange G', and the latter is so adapted in length with reference to the supporting-ledge C as that it will bear upon said ledge before the top of the wall A contacts with the inner face of the cover, and thereby permit of the insertion of a rubber packing-strip H between the latter without subjecting said strip to the entire weight of the cover and of a load thereon.

The outer rim of the cover is made to extend over and beyond the top of the wall A, and is brought into contact with the inner periphery of the upper end or rim of the wall D, so as to be protected thereby against lateral blows from the wheels of vehicles passing over it.

In use the upper edge of the outer wall D is brought to the level of the ground or pavement, so that the top of the cover F, fitted within it, shall be at the same level, as shown in Fig. 1. The cover F, when fitted in place, not only seals the man-hole or testing-chamber upon which it is placed, but also protects it completely from the possible inflow therein of water falling upon or flowing over the cover, since any of the water which may work its way through the joint between the cover and the outer wall D will drop into the drip-chamber E, and thence percolate and be carried off from the bottom thereof through the ground. Thus by means of my invention the annoyance and expense attending the inflow of water at the man-hole covers from rains and melting snows may be wholly avoided.

I claim as my invention—

1. The combination, with the inclosing-wall of a testing-chamber or man-hole for subways, of an outer wall encircling the first or inner wall and carried up above it, leaving an intermediate drip-chamber, and a cover made to fit within the top of the outer wall and to rest upon the inner wall and form a close joint therewith, substantially in the manner and for the purpose herein set forth.

2. The combination, with the wall A of a testing-chamber or man-hole cover, of an outer wall D, encircling the said wall at a short distance therefrom and projecting above its top edge, a cover F, fitting closely within the upper rim of the outer wall and resting upon the top of the inner wall, flanges G G', projecting from the inner face of said cover to embrace between them the top edge of said inner wall, and a packing-strip H, inserted in the recess between the flanges, substantially in the manner and for the purpose herein set forth.

In testimony whereof I have signed my name to this specification in the presence of two subscribing witnesses.

JOHN STAFFORD.

Witnesses:
A. N. JESBERA,
E. M. WATSON.